(12) United States Patent
Tomioka et al.

(10) Patent No.: US 7,312,986 B2
(45) Date of Patent: Dec. 25, 2007

(54) COOLING DEVICE FOR AN ELECTRONIC APPARATUS

(75) Inventors: Kentaro Tomioka, Saitama (JP); Yukihiko Hata, Tokyo (JP); Kenichi Ito, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 304 days.

(21) Appl. No.: 11/230,172

(22) Filed: Sep. 19, 2005

(65) Prior Publication Data

US 2006/0187640 A1 Aug. 24, 2006

(30) Foreign Application Priority Data

Feb. 21, 2005 (JP) .......................... P2005-044140

(51) Int. Cl.
   *H05K 7/20* (2006.01)
(52) U.S. Cl. ....................... 361/687; 361/698; 361/699; 165/80.2; 165/80.3; 165/80.4; 165/80.5; 174/15.1; 174/16.3; 417/55.1; 417/423.1; 417/423.12
(58) Field of Classification Search ........ 361/687–689, 361/698–702, 703–709; 174/15.1, 16.3; 257/714, 715; 165/80.2, 80.3, 80.4, 80.5, 165/104.33, 185, 104.34, 122; 417/55.1, 417/423.1, 423.8, 354, 423.12, 423.14; 62/252.1, 62/252.2, 3.2; 415/55.2, 55.3, 55.4, 176, 415/177, 178
See application file for complete search history.

(56) References Cited

U.S. PATENT DOCUMENTS

| 6,408,937 | B1 * | 6/2002 | Roy .................... 165/104.33 |
| 6,728,102 | B2 * | 4/2004 | Ishikawa et al. ............ 361/687 |
| 6,808,371 | B2 * | 10/2004 | Niwatsukino et al. ....... 417/353 |
| 6,832,646 | B1 * | 12/2004 | Uomori et al. ............ 165/80.2 |
| 6,839,234 | B2 * | 1/2005 | Niwatsukino et al. ...... 361/695 |
| 7,016,195 | B2 * | 3/2006 | Ito et al. .................... 361/699 |
| 7,124,811 | B2 * | 10/2006 | Crocker et al. ........ 165/104.33 |
| 7,255,154 | B2 * | 8/2007 | Koga et al. ............ 165/104.33 |
| 2003/0151892 | A1 * | 8/2003 | Kondo et al. ............... 361/687 |
| 2004/0240179 | A1 * | 12/2004 | Koga et al. ................. 361/699 |
| 2005/0178526 | A1 * | 8/2005 | Naganawa et al. ........ 165/80.2 |
| 2005/0226745 | A1 * | 10/2005 | Seko et al. ............ 417/423.14 |

FOREIGN PATENT DOCUMENTS

JP 07286592 A * 10/1995

* cited by examiner

Primary Examiner—Michael Datskovskiy
(74) Attorney, Agent, or Firm—Blakely, Sokoloff, Taylor & Zafman LLP

(57) ABSTRACT

A cooling device comprises a circulation passage through which a liquid coolant flows, and a pump provided in the circulation passage configured to circulate the liquid coolant along the circulation passage. The pump includes, (1) a pump casing including a pump chamber into which the liquid coolant flows, (2) an impeller mounted in the pump chamber to push out the liquid coolant from the pump chamber to the circulation passage, and (3) an injection portion provided in the pump casing configured to inject the liquid coolant to the pump chamber.

20 Claims, 8 Drawing Sheets

COOLING DEVICE FOR AN ELECTRONIC APPARATUS

CROSS-REFERENCE TO RELATED APPLICATIONS

This application is based upon and claims the benefit of priority from Japanese Patent Application No. 2005-44140, filed Feb. 21, 2005, the entire contents of which are incorporated herein by reference.

BACKGROUND

1. Field

One embodiment of the invention relates to a cooling device in which liquid coolant is circulated for cooling a heat generating element in an electronic apparatus.

2. Description of the Related Art

Regarding a CPU or the like used in an electronic apparatus such as a portable computer, the amount of heat generated during operations is increasing, accompanying with faster speed operation and more multifunctional device. If the temperature of the CPU becomes too high, the CPU processing speed may decrease and there may be errors in the CPU operation.

In recent years, in order to increase cooling performance for the CPU, electronic apparatuses have been implemented with a so-called liquid cooling type cooling device in which liquid coolant (hereinafter "coolant") such as antifreeze or water, is circulated. Heat generated by the CPU is radiated outside the electronic apparatus by using the coolant having a specific heat which is much higher that air.

The above-described conventional cooling device comprises a heat receiving portion thermally connected to the CPU, a heat radiation portion which radiates a heat of the CPU, a circulation passage which makes connection between the heat reception portion and the heat radiation portion, and a pump which circulates a liquid coolant along the circulation passage.

The liquid coolant absorbs the heat from the CPU by heat exchange at the heat reception portion. The heated liquid coolant is sent to the heat radiation portion through the circulation passage and radiates the heat of the CPU in a course of passing the heat radiation portion. The liquid coolant cooled at the heat radiation portion returns to the heat reception portion through the circulation passage and absorbs the heat of the CPU again. By circulation of the liquid coolant, the heats of the CPU are sequentially transferred to the heat radiation portion, from which the transferred heats are radiated outside of a portable computer.

U.S. Pat. No. 6,519,147 discloses an electronic apparatus with this type of cooling device.

In the meantime, a conventional cooling device is provided with a reserve tank in the middle of a circulation passage. The reserve tank is intended to supplement an evaporation component of the liquid coolant and reserves a predetermined amount of the liquid coolant. Further, the reserve tank has an injection port. The injection port is available for use in injecting the liquid coolant into the circulation passage and is closed by a removable cap except for a liquid coolant injection mode.

According to such the conventional cooling device, after a heat reception portion has been connected to a heat radiation portion via a circulation passage, a liquid coolant is injected from an injection port of a reserve tank to a circulation passage. However, in a state in which piping of the circulation passage has been completed, a sealed space in which the inside of the circulation passage is shielded from the outside is provided. Therefore, even if the liquid coolant is injected from the injection port, the flow of the liquid coolant is prevented by the air which remains inside of the circulation passage or inside of the pump, and a long time is required until the liquid coolant has reached the pump.

As a result, even if an attempt is made to drive the pump and transfer the liquid coolant to the circulation passage, a wait time is extended until the pump has functioned efficiently. In other words, it takes long to fill the circulation passage with the liquid coolant.

BRIEF DESCRIPTION OF THE SEVERAL VIEWS OF THE DRAWINGS

The accompanying drawings, which are incorporated in and constitute a part of the specification, illustrate embodiments of the invention, and together with the detailed description of the embodiments given below, serve to explain the principles of the invention.

DETAILED DESCRIPTION

Various embodiments according to the present invention will be described hereinafter with reference to the accompanying drawings. In general, according to one embodiment of the invention, a cooling device comprises a circulation passage through which a liquid coolant flows, and a pump provided in the circulation passage configured to circulate the liquid coolant along the circulation passage. The pump includes, (1) a pump casing including a pump chamber into which the liquid coolant flows, (2) an impeller mounted in the pump chamber to push out the liquid coolant from the pump chamber to the circulation passage, and (3) an injection portion provided in the pump casing configured to inject the liquid coolant to the pump chamber.

Figure 1:
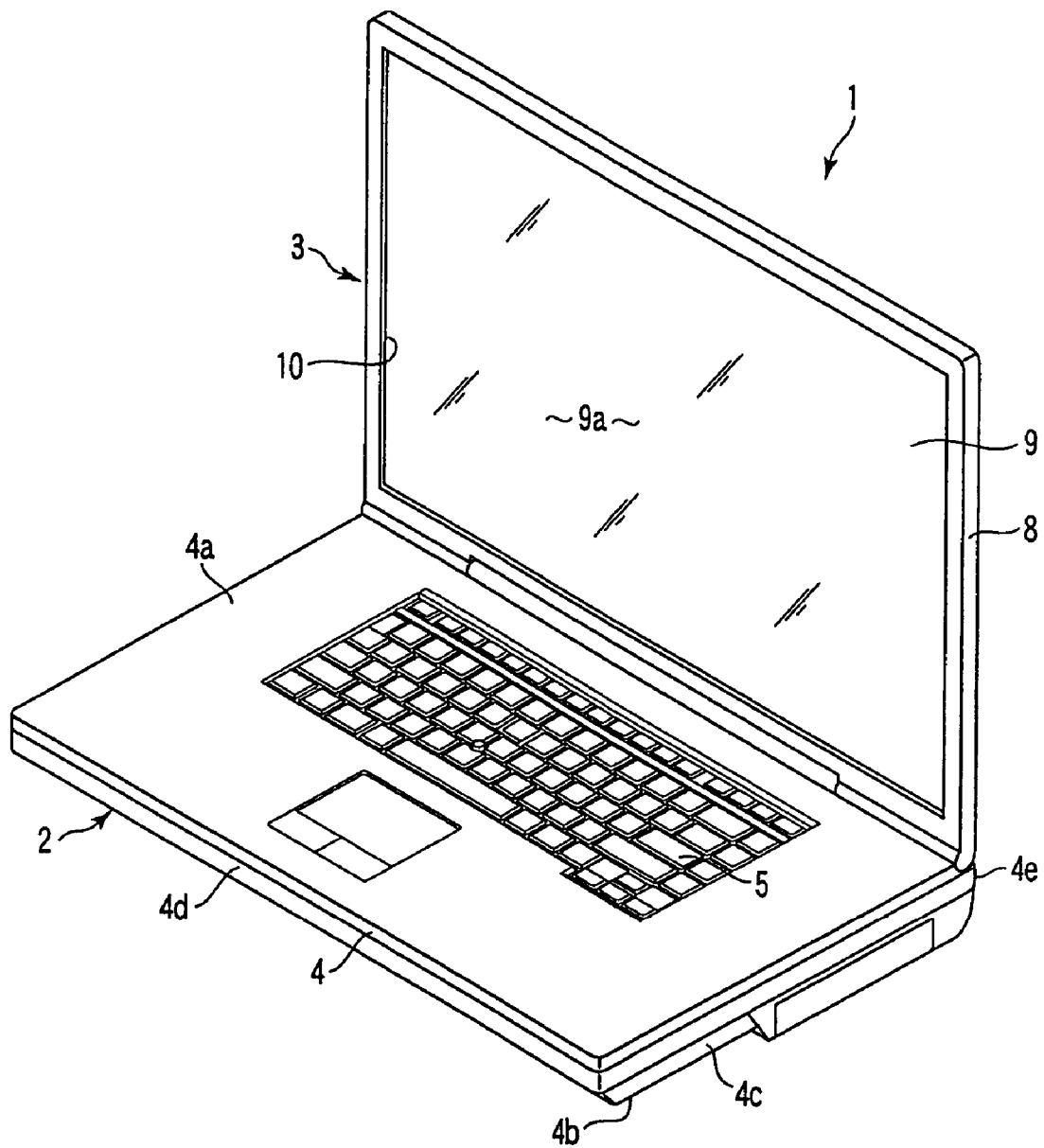
FIG. 1 is a perspective view of an exemplary portable computer according to an embodiment of the present invention.

FIG. 1 shows a portable computer 1 which is an exemplary electronic apparatus. The portable computer 1 includes a main unit 2 and a display unit 3. The main unit 2 has a flat box shaped first housing 4. The first housing 4 has a top wall 4a, a bottom wall 4b, right and left side walls 4c, a front wall 4d, and a rear wall 4e. The top wall 4a supports a keyboard 5. The rear wall 4e has a plurality of exhaust outlets 6 as shown in FIG. 2.

The display unit 3 includes a second housing 8 and a liquid crystal display panel (also referred as "LCD panel") 9. The LCD panel 9 is housed in the second housing 8. The liquid crystal display panel 9 has a screen 9a which displays an image. The screen 9a is exposed outside of the second housing 8 through an opening 10 formed on a front surface of the second housing 8.

The second housing 8 is supported at a rear end part of the first housing 4 via a hinge (not shown). Thus, the display unit 3 is turnably between a closed position laid on the main unit 2 so as to cover the keyboard 5 from above and an open position at which the display unit 3 is erected so as to expose the keyboard 5 and the screen 9a.

Figure 2:
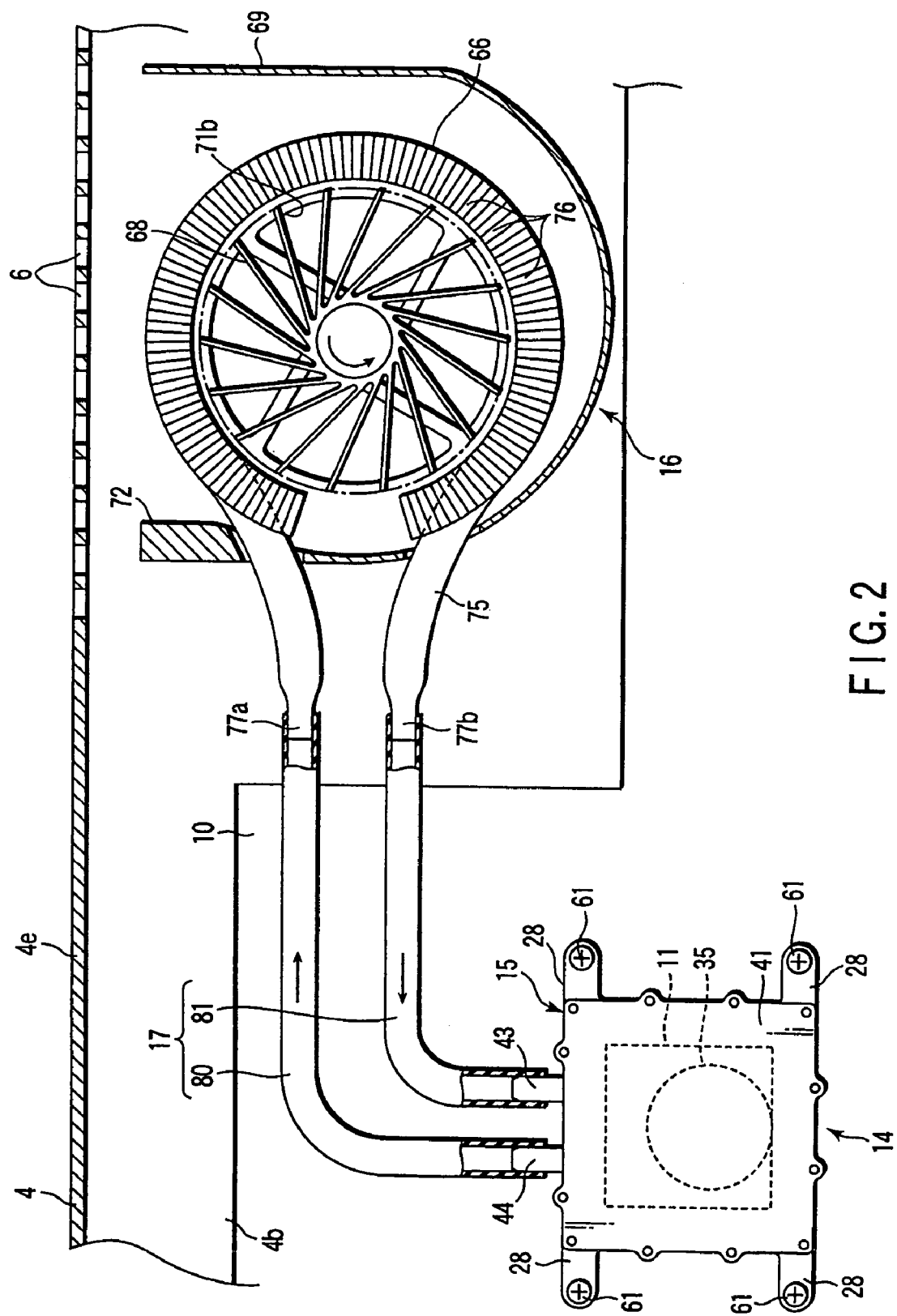
FIG. 2 is an exemplary partially cut away view of a state in which a cooling device is housed in a first housing according to the embodiment.
Figure 3:
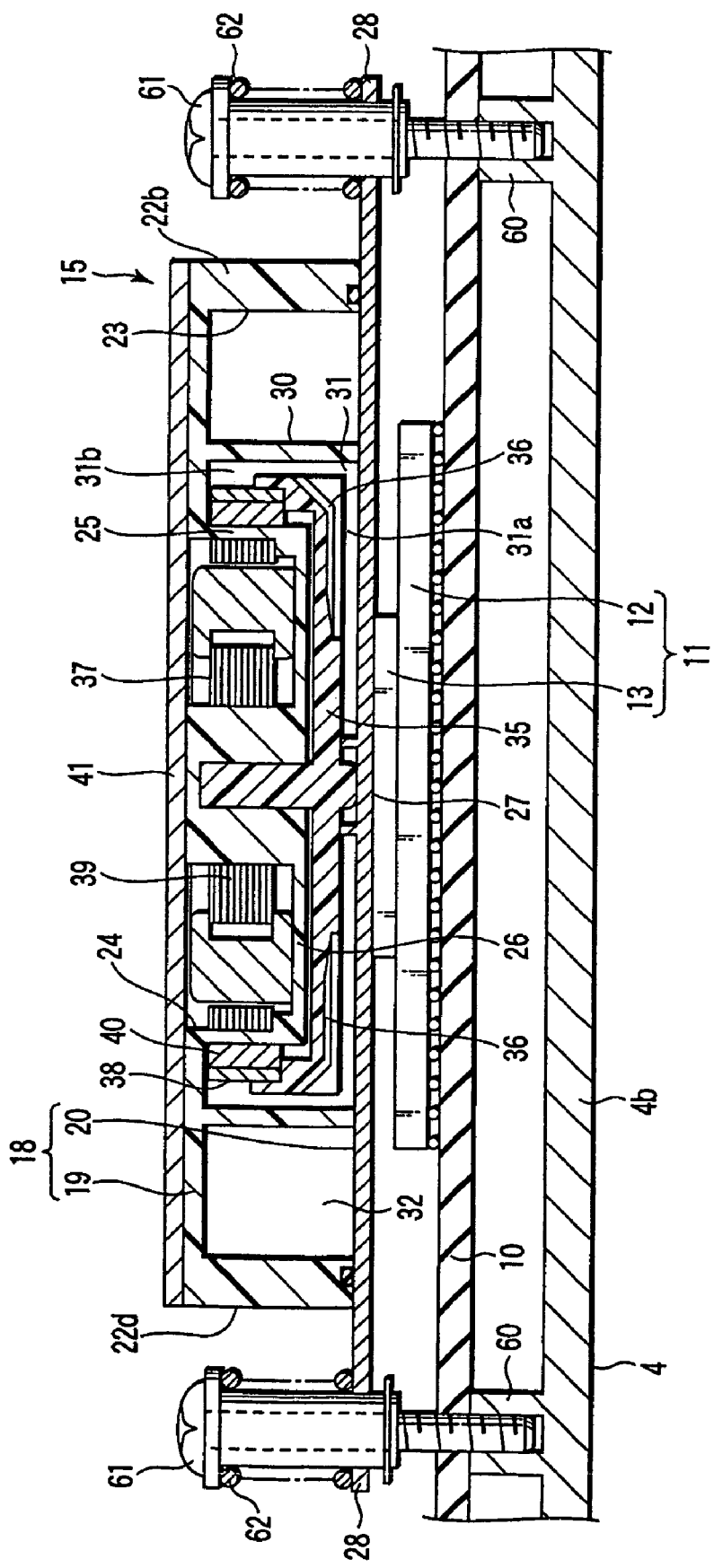
FIG. 3 is an exemplary sectional view showing a state in which a pump and a CPU are thermally connected to each other according to the embodiment.

As shown in FIGS. 2 and 3, the first housing 4 houses a printed circuit board (also referred as "PC board") 10. A CPU 11 as a heat generating element is mounted on an upper surface of a rear end part of the PC board 10. The CPU 11 has a base substrate 12 and an IC chip 13 positioned at a center part of an upper surface of the base substrate 12. The IC chip 13 is very large in heating quantity during operation with faster processing speed or multiple functioning, and requires cooling in order to maintain stable operation.

The first housing 4 houses a liquid cooling type cooling device 14 which cools the CPU 11 by using a liquid coolant such as, for example, antifreeze liquid or water. The cooling device 14 comprises a heat exchange type pump (hereinafter "pump") 15 which is also used as a heat reception portion, a heat radiator 16 as a heat radiation portion, and a circulation passage 17.

As shown in FIGS. 4 to 7, the pump 15 includes a pump casing 18. The pump casing 18 has a casing body 19 and a heat reception cover 20. The casing body 19 is a flat rectangular box shape larger than the CPU 11, and is made of, for example, a synthetic resin having heat resistance. The casing body 19 has first to fourth side walls 22a, 22b, 22c, and 22d. The first side wall 22a and the third side wall 22c, and the second side wall 22b and the fourth side wall 22d are disposed in parallel to each other.

Further, the casing body 19 includes a first recessed part 23 and a second recessed part 24. The first recessed part 23 opens on a lower surface of the casing body 19. The second recessed part 24 of FIG. 3 opens on the upper surface of the casing body 19. The second recessed part 24 has a cylindrical peripheral wall 25 and a circular end wall 26 positioned at a lower end of the peripheral wall 25. The peripheral wall 25 and the end wall 26 are positioned inside of the first recessed part 23.

The heat reception cover 20 is made of a metal having high heat conductivity such as, for example, copper or aluminum. The heat reception cover 20 is fixed to the lower surface of the casing body 19 so as to close an opening end of the first recessed part 23. The lower surface of the heat reception cover 20 forms a flat heat reception surface 27. The heat reception surface 27 is exposed downwardly of the pump casing 18.

The heat reception cover 20 has four tongue pieces 28. The tongue pieces 28 are extended laterally of the casing body 19 from four corners of the heat reception cover 20.

The casing body 19 has a cylindrical peripheral wall 30. The peripheral wall 30 coaxially surrounds the peripheral wall 25 of the second recessed part 24 and its lower end is adhered to an inner surface of the heat reception cover 20. The peripheral wall 30 partitions the inside of the first recessed part 23 between a pump chamber 31 and a reserve tank 32.

As shown in FIG. 3, the pump chamber 31 has a first region 31a and a second region 31b. The first region 31a is positioned between the heat reception cover 20 and the end wall 26 of the second recessed part 24. The second region 31b is positioned between the peripheral wall 25 of the second recessed part 24 and the peripheral wall 30 of the casing body 19.

Figure 7:
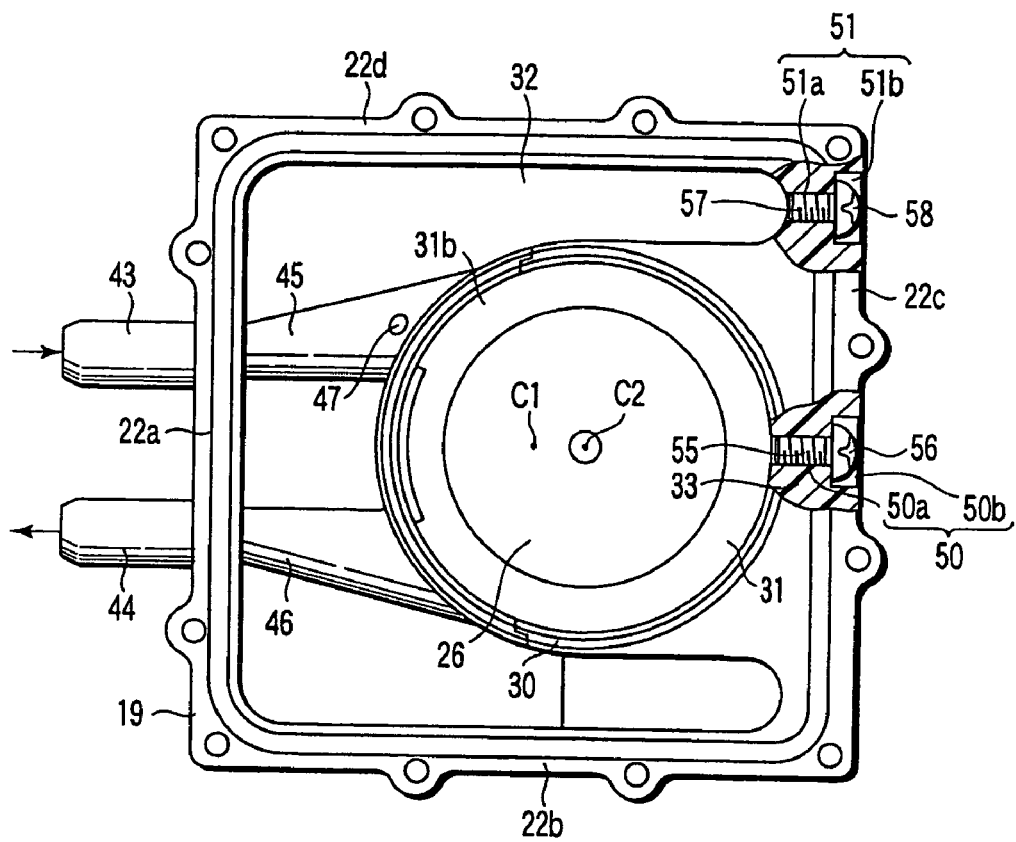
FIG. 7 is an exemplary plan view of the casing body showing a state in which first and second holes are closed by first and second screws according to the embodiment.

As shown in FIG. 7, the pump chamber 31 is displaced in a direction of the third side wall 22c of the casing body 19 with respect to a center C1 of the casing body 19. Thus, the peripheral wall 30 has an extension part 33 which extends toward the third side wall 22c, and the extension part 33 is integrated with the third side wall 22c.

The reserve tank 32 reserves a liquid coolant. The reserve tank 32 surrounds the pump chamber 31 in directions of the first side wall 22a, the second side wall 22b, and the fourth side wall 22d.

An impeller 35 is housed in the pump chamber 31. The impeller 35 is rotatably supported between the end wall 26 of the second recessed part 24 and the heat reception cover 20. A plurality of vanes 36 are formed on a lower surface of the impeller 35. The vanes 36 radiates out from a rotational center C2 of the impeller 35 and are exposed to the first region 31a of the pump chamber 31.

A flat motor 37 for rotating the impeller 35 is arranged in the casing body 19. The flat motor 37 has a ring shaped rotor 38 and a stator 39. The rotor 38 is coaxially fixed to an outer periphery of the impeller 35, and is housed in the second region 31b of the pump chamber 31. A ring shaped magnet 40 is engaged inside of the rotor 38. The magnet 40 rotates integrally with the rotor 38 and the impeller 35.

The stator 39 is housed in the second recessed part 24 of the casing body 19. The stator 39 is coaxially positioned inside of the magnet 40 of the rotor 38. The peripheral wall 25 of the second recessed part 24 is interposed between the stator 39 and the magnet 40. Further, a back plate 41 is fixed to the upper surface of the casing body 19. The back plate 41 closes an opening end of the second recessed part 24 and covers the stator 39.

Power is supplied to the stator 39, for example, at the same time as when power is supplied to the portable computer 1. By this power supply, a rotational magnetic field is generated in a peripheral direction of the stator 39. The magnetic field and the magnet 40 of the rotor 38 are magnetically coupled with each other. As a result, a torque along the peripheral direction of the rotor 38 is generated between the stator 39 and the magnet 40, and thereby the impeller 35 rotates.

As shown in FIGS. 4 to 7, the casing body 19 has a suction port 43 which guides the liquid coolant to the pump chamber 31 and an ejection port 44 which ejects the liquid coolant from the pump chamber 31. The suction port 43 and the ejection port 44 protrude from the first side wall 22a of the casing body 19 and are arranged with intervals to each other.

The suction port 43 is connected with the pump chamber 31 via a first connection passage 45. The ejection port 44 is connected with the pump chamber 31 via a second connection passage 46. The first and second connection passages 45, 46 cross the inside of the reserve tank 32. The first connection passage 45 has a through hole 47 for air-liquid separation. The through hole 47 opens inside of the reserve tank 32 and is positioned under a liquid level of the liquid coolant always reserved in the reserve tank 32. Therefore, the pump chamber 31 communicates with the reserve tank 32 via the through hole 47, and air may be separated from the liquid when it goes by the through hole 47.

Figure 4:
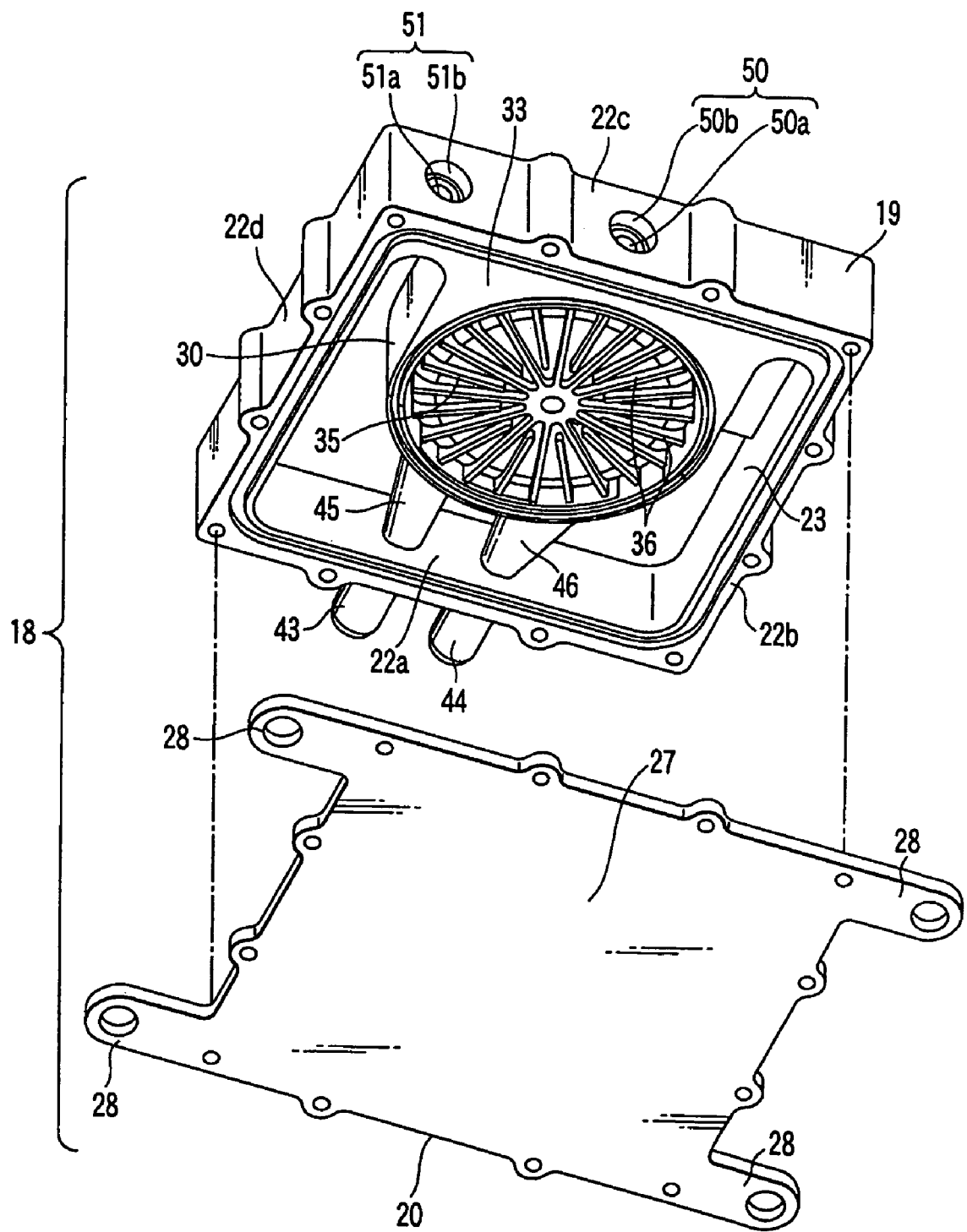
FIG. 4 is an exemplary perspective view of the pump showing a state in which a casing body and a heat reception cover are separated from each other according to the embodiment.
Figure 5:
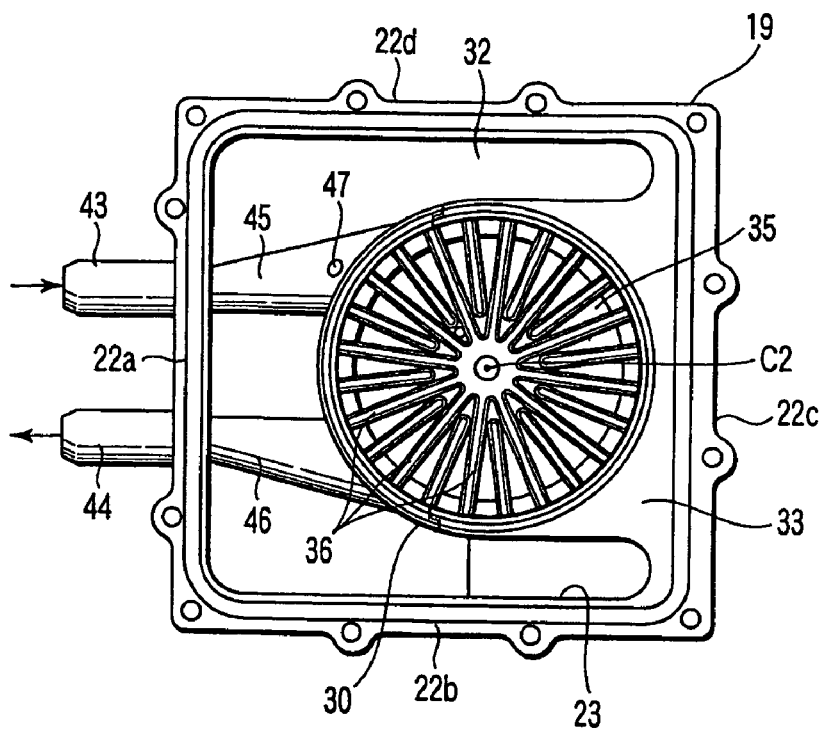
FIG. 5 is an exemplary plan view of the casing body showing a state in which an impeller is housed in a pump chamber according to the embodiment.
Figure 6:
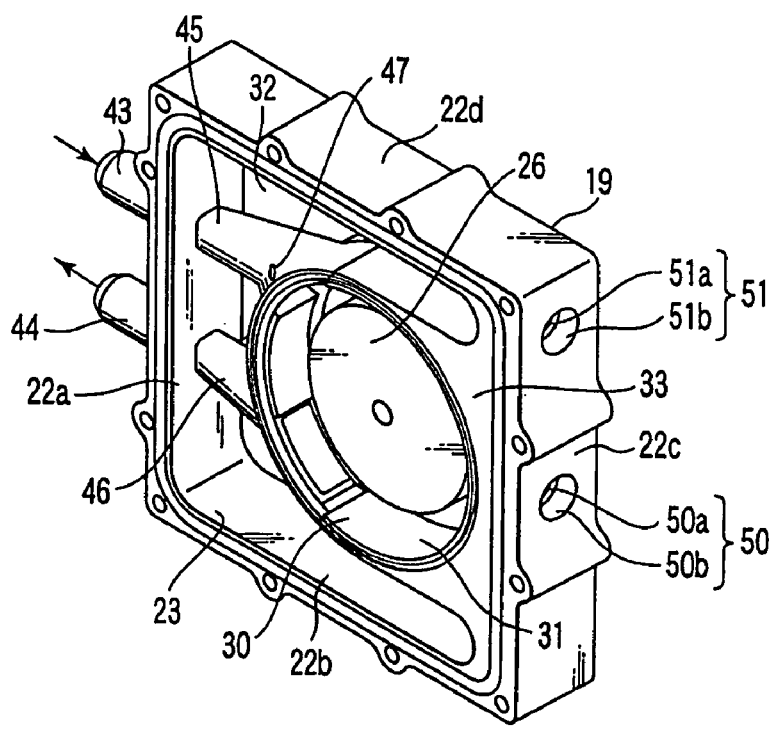
FIG. 6 is an exemplary perspective view of the casing body according to the embodiment.
Figure 11:
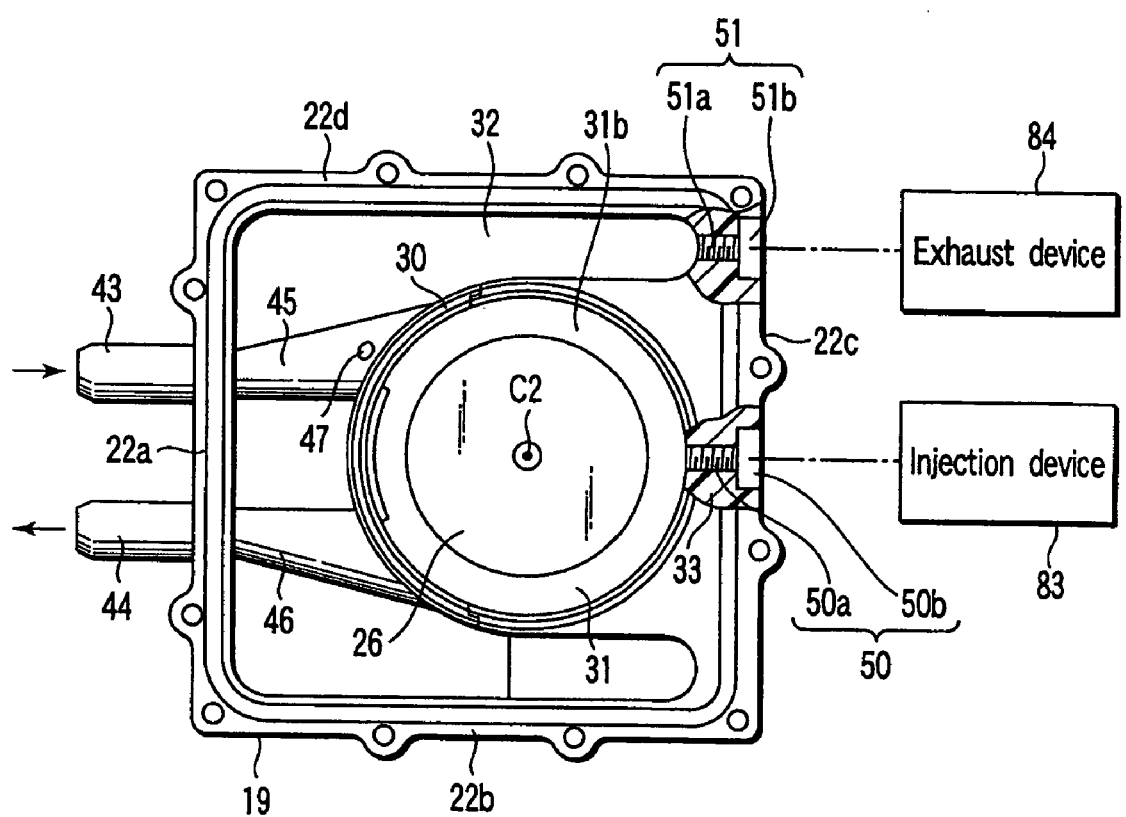
FIG. 11 is an exemplary plan view showing a state in which an injection device is connected to the first hole of the casing body and an exhaust device is connected to the second hole of the casing body according to the embodiment.

As shown in FIGS. 4, 7, and 11, the casing body 19 has a first hole 50 which is an exemplary injection hole and a second hole 51 which is an exemplary exhaust hole. The first hole 50 opens in the pump chamber 31 through the extension part 33. The second hole 51 opens in the reserve tank 32 through the extension part 33. Thus, the first and second holes 50, 51 are formed at the third side wall 22c of the casing body 19, and are provided in line on a same outside surface of the third side wall 22c.

In other words, the first and second holes 50, 51 are positioned at an opposite side with respect to the suction port 43 and the ejection port 44 while the impeller 35 is sandwiched between the holes and the ports. In more detail, in the pump 15 as described above, the reserve tank 32 is present between each of the first, second, and fourth side walls 22a, 22b, and 22d of the casing body 19 and the pump chamber 31. Thus, according to one embodiment of the invention, it is preferable to provide an opening end of the first hole 50 to the pump chamber 31 within the range of, for example, 90° to 270° in the peripheral direction of the impeller 35 from the suction port 43 around the rotational center C2 of the impeller 35 so as to avoid the reserve tank 32.

In the present embodiment, as a preferable example, the first hole 50 is provided at a position shifted by approximately 180° in the peripheral direction of the impeller 35 from the suction port 43 and the ejection port 44 of the casing body 19 around the rotational center C2 of the impeller 35.

Further, since the second hole 51 is provided in line with the first hole 50, it is preferable to provide an opening end of the second hole 51 to the reserve tank 32 within the range of, for example, 90° to 270° in the peripheral direction of the impeller 35 from the ejection port 44 around the rotational center C2 of the impeller 35, as well.

The first hole 50 has a small diameter part 50a which opens in the pump chamber 31 and a large diameter part 50b which opens in the outside surface of the third side wall 22c. The large diameter part 50b has an end surface where the small diameter part 50a coaxially opens. Similarly, the second hole 51 has a small diameter part 51a which opens in the reserve tank 32 and a large diameter part 51b which opens in the outside surface of the third side wall 22c. The large diameter part 51b has an end surface where the small diameter part 51a coaxially opens.

Figure 8:
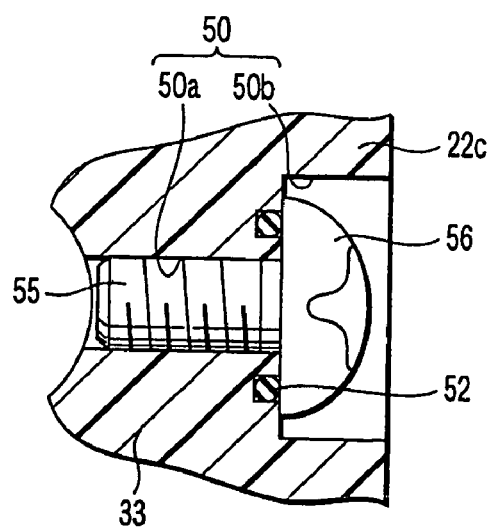
FIG. 8 is an exemplary sectional view showing a state in which the first hole of the casing body is closed by the first screw according to the embodiment.

As shown in FIG. 8, an O-ring 52 is incorporated so as to surround an opening end of the small diameter part 50a on the end surface of the large diameter part 50b of the first hole 50. The O-ring 52 is also assembled on the end surface of the large diameter part 51b of the second hole 51, although not shown.

The first hole 50 is closed by a first screw 55 as a closing member. The first screw 55 is removably threaded into the small diameter part 50a of the first hole 50. The O-ring 52 positioned on the end surface of the large diameter part 50b comes into contact with a head part 56 of the first screw 55, thereby sealing the first hole 50 with liquid tightness. The first hole 50, the first screw 55, and the O-ring 52 form an injection portion.

The second hole 51 is closed by a second screw 57 as a closing member. The second screw 57 is removably threaded into the small diameter part 51a of the second hole 51. The O-ring 52 positioned on the end surface of the large diameter part 51b comes into contact with a head part 58 of the second screw 57, thereby sealing the second hole 51 with light tightness. The second hole 51, the second screw 57, and the O-ring 52 form an exhausted portion.

As shown in FIG. 3, the pump 15 is placed on the PC board 10 at a behavior in which the heat reception cover 20 is oriented to the CPU 11. The pump casing 18 of the pump 15 is fixed to the bottom wall 4b of the first housing 4 together with the PC board 10. The bottom wall 4b has a boss part 60 at a position which corresponds to each of the four tongue pieces 8 of the pump casing 18. The boss part 60 protrudes upwardly of the bottom wall 4b. The PC board 10 is superimposed on a distal end surface of the boss part 60.

Screws 61 are respectively inserted into the tongue pieces 28 of the pump casing 18 from the above. The screw 61 is threaded into the boss part 60 through the PC board 10. A coil spring 62 is mounted outside of each of the screws 61. The coil spring 62 is biased while the pump casing 18 is oriented to the PC board 10 via the tongue pieces 28 of the pump casing 18. In this manner, the heat reception surface 27 of the pump casing 18 is thermally connected to the IC chip 13 of the CPU 11.

Figure 9:
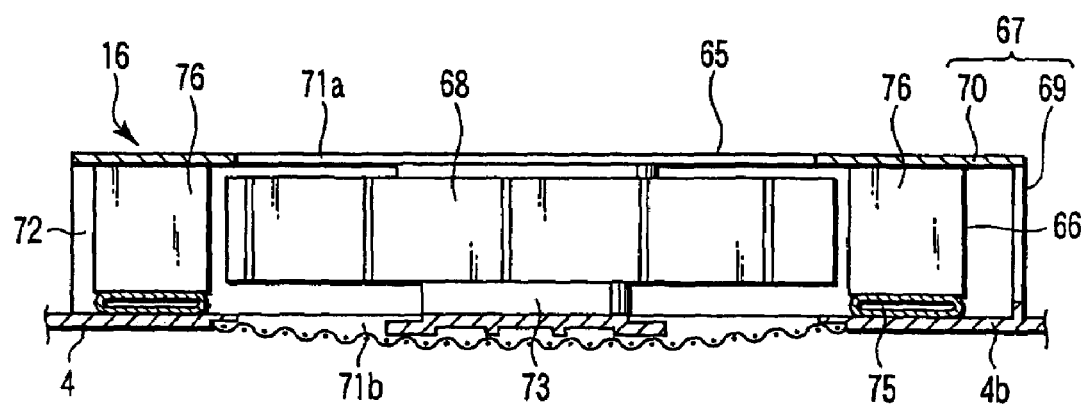
FIG. 9 is an exemplary sectional view of a heat radiator according to the embodiment.
Figure 10:
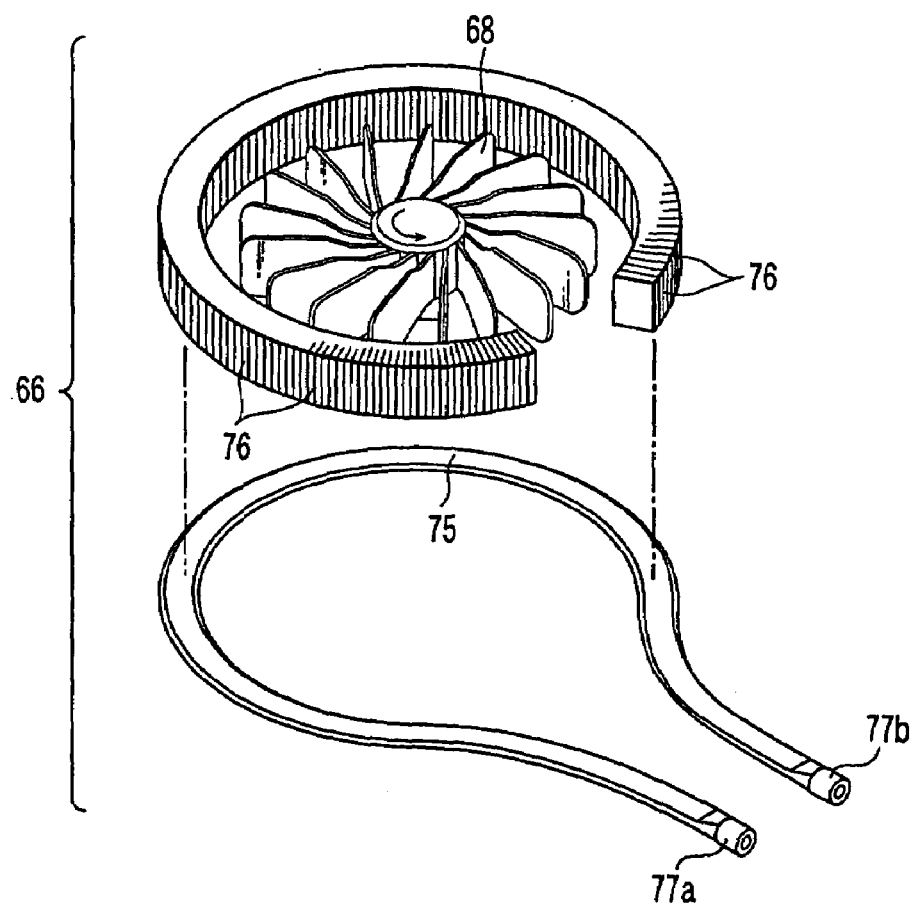
FIG. 10 is an exemplary perspective view of a heat radiation block showing a positional relationship between heat radiation fins and a coolant passage according to the embodiment.

On the other hand, the heat radiator 16 of the cooling device 14 is housed at the rear part of the first housing 4, and is provided in line with the pump 15. As shown in FIG. 9, the heat radiator 16 is provided with a fan 65 and a heat radiation portion (or block) 66. The fan 65 has a flat fan case 67 and a centrifugal type impeller (hereinafter "impeller") 68 housed in the fan case 67.

The fan case 67 is composed of a case body 69 and a top plate 70. The case body 69 is formed integrally with the bottom wall 4b of the first housing 4, and is erected from the bottom wall 4b. The top plate 70 is fixed to an upper end of the case body 69.

The fan case 67 has a pair of suction ports 71a, 71b and an exhaust port 72. One suction port 71a opens at the center part of the top plate 70. The other suction port 71b opens at the bottom wall 4b of the first housing 4. The exhaust port 72 is formed at the case body 69, and is oriented to the exhaust outlet 6 of the first housing 4.

The impeller 68 is supported on the bottom wall 4b of the first housing 4 via the flat motor 73. The flat motor 73 rotates the impeller 68 in the counterclockwise direction indicated by the arrow shown in FIG. 2. By means of this rotation, the air outside of the fan case 67 is suctioned at the rotational center part of the impeller 68 via the suction ports 71a, 71b. The suctioned air is ejected from an outer periphery of the impeller 68 by means of a centrifugal force.

The heat radiation block 66 of the heat radiator 16 is housed inside of the fan case 67 so as to surround the impeller 68. As shown in FIGS. 2 and 9, the heat radiation portion 66 has a coolant passage 75 through which a liquid coolant flows and a plurality of heat radiation fins 76. The coolant passage 75 is composed of, for example, a flat copper pipe, and is formed in a ring shape such that the impeller 68 is coaxially surrounded. The coolant passage 75 is superimposed on the bottom wall 4b of the first housing 4, and is thermally connected to the first housing 4.

The coolant passage 75 has an upstream end part 77a and a downstream end part 77b. The upstream end part 77a and the downstream end part 77b are adjacent to each other, and are drawn out of the fan case 67 through the case body 69.

The heat radiation fin 76 is made a metal having its excellent heat conductivity such as, for example, an aluminum alloy, and is formed in a rectangular plate shape. The heat radiation fins 76 are provided in line with intervals in the peripheral direction of the impeller 68, and its lower end is soldered on the upper surface of the coolant passage 75. The upper end of the heat radiation fin 76 abuts against the inner surface of the top plate 70 of the fan case 67, and is thermally connected to the top plate 70.

As shown in FIG. 2, the circulation passage 17 of the cooling device 14 has a first channel passage 80 and a second channel passage 81. The first channel passage 80 is connected between the ejection port 44 of the pump 15 and the upstream end part 77a of the coolant passage 75. The second channel passage 81 is connected to the suction port 43 of the heat exchange type pump 15 and the downstream end part 77b of the coolant passage 75. Therefore, the coolant passage 75 of the heat radiator 16 is compatible with part of the circulation passage 17 which makes connection between the suction port 43 and the ejection port 44 of the heat exchange type pump 15. In this embodiment, the circulation passage 17 is distinguished from the coolant passage 75, but it is possible to call the combination of the circulation passage 17 and the coolant passage 75 as the "circulation passage".

Now, an operation of the cooling device 14 will be described here.

The IC chip 13 of the CPU 11 generates a heat while the portable computer 1 is used. The heat generated from the IC chip 13 is transmitted to the pump casing 18 of the pump 15 through the heat reception surface 27. The pump chamber 31 and the reserve tank 32 of the pump casing 18 are filled with a liquid coolant, and thus, the liquid coolant absorbs a heat transmitted from the IC chip 13 to the pump casing 18.

When the impeller 35 of the pump 15 rotates, a kinetic energy is provided to the liquid coolant filled in the pump chamber 31, and a pressure of the liquid coolant contained in the pump chamber 31 is gradually increased due to the kinetic energy. The pressurized liquid coolant is pushed out from the pump chamber 31 to the ejection port 44 via the second connection passage 46 and is transferred to the heat radiator 16 through the first channel passage 80.

The liquid coolant transferred to the heat radiator 16 flows the coolant passage 75 from the upstream end part 77a to the lower end part 77b. In a course of this flow, the heat of the IC chip 13 absorbed by the liquid coolant is transmitted to the heat radiation fins 76 via the coolant passage 75 and is radiated from the heat radiation fins 76.

The fan 65 of the heat radiator 16 starts operation, for example, when a temperature of the CPU 11 reaches a predetermined value. In this manner, the impeller 68 rotates and ejects the cooling air from its outer periphery. The cooling air passes between the adjacent heat radiation fins 76. Consequently, the coolant passage 75 and the heat radiation fins 76 are forcibly cooled, and a large quantity of the heat transmitted to both of these elements is taken way with the flow of the cooling air.

The cooling air passed through the heat radiation fins 76 is discharged outside of the main unit 2 through the exhaust outlet 6 of the first housing 4 from the exhaust port 72 of the fan case 67.

The liquid coolant cooled by heat exchange at the heat radiator 16 returns from the downstream end part 77b of the coolant passage 75 to the suction port 43 of the heat exchange type pump 15 via the second channel passage 81. The liquid coolant is guided to the pump chamber 31 through the first connection passage 45.

The first connection passage 45 communicates with the reserve tank 32 via the through hole 47. Thus, part of the liquid coolant flowing through the first connection passage 45 is ejected into the reserve tank 32 through the though hole 47. As a result, in the case where air bubbles are included in the liquid coolant which returns from the heat radiator 16 to the heat exchange type pump 15, the air bubbles may be separated from the liquid coolant after being guided to the reserve tank 32.

The liquid coolant guided to the pump chamber 31 is sent out from the ejection port 44 toward the heat radiator 16 after being pressurized again by rotation of the impeller 35. Therefore, the liquid coolant repeats circulation between the heat exchange type pump 15 and the heat radiator 16, and the heat of the IC chip 13 are sequentially transferred to the heat radiator 16 by means of circulation of the liquid coolant.

In the meantime, in the above-described cooling device 14, the liquid coolant for transferring the heat of the IC chip 13 to the heat radiator 16 is injected to the cooling device 14 after being connected between the heat exchange type pump 15 and the heat radiator 16 through the circulation passage 17.

In this embodiment, the liquid coolant is injected from the pump 15 to the cooling device 14. A method for injection of the liquid coolant will be described with referring to FIG. 11.

At a time point at which the liquid coolant is injected, the first and second holes 50, 51 of the pump casing 18 are maintained in a released state without being closed by the first and second screws 55, 57. Then, an injecting device 83 is connected to the first hole 50 which opens in the pump chamber 31, and an exhaust device 84 is connected to the second hole 51 which opens in the reserve tank 32.

In this state, the injection device 83 is driven, and the liquid coolant is directly injected from the injection device 83 to the pump chamber 31 of the pump 15. The first hole 50, which is an injection end of the liquid coolant, is provided at a position shifted by approximately 180° in the peripheral direction of the impeller 35 from the suction port 43 and the ejection port 44 of the casing body 19 around the rotational center C2 of the impeller 35. Thus, the first hole 50 is established in a positional 5 relationship such that the hole is opposed to the suction port 44 or the ejection port 44 while the rotational center C2 of the impeller 35 is sandwiched between the hole and the ports, and is the most distant from the suction port 43 or the ejection port 44.

Thus, the liquid coolant injected from the first hole 50 to the pump chamber 31 does not outflow from the suction port 43 or the ejection port 44, and the pump chamber 31 may be filled with the liquid coolant within a relatively short period of time. After the pump chamber 31 has been filled with the liquid coolant, the impeller 35 is rotated. In this manner, the liquid coolant contained in the pump chamber 31 is pushed out from the ejection port 44 to the first channel passage 80 of the circulation passage 17.

On the other hand, the exhaust device 84 starts operation in synchronism with the start of injection of the liquid coolant by means of the injection device 83. Consequently, the air contained in the reserve tank 32 is suctioned. Since the reserve tank 32 communicates with the first connection passage 45 through the through hole 47, the air contained in the circulation passage 17, the coolant passage 75 of the heat radiation 16, and the pump chamber 31 are suctioned from the second hole 51. Accordingly, the liquid coolant pushed out from the pump chamber 31 to the ejection port 44 is quickly suctioned by the circulation passage 17 and reaches the suction port 43 of the pump casing 18 through the circulation passage 17.

The liquid coolant reached the suction port 43 flows into the pump chamber 31 via the second channel passage 81, and part of the liquid coolant flows into the reserve tank 32 from the through hole 47. The liquid coolant flowing into the pump chamber 31 is pushed out from the ejection port 44 after being pressurized by means of rotation of the impeller 35.

By continuing such a work, the air contained in the pump chamber 31, the reserve tank 32, the circulation passage 17, and the coolant passage 75 of the heat radiator 16 is replaced with the liquid coolant. In this manner, an injection work of a set of liquid coolant is completed.

After the injection work of the liquid coolant has completed, the injection device 83 is removed from the first hole 50, and the first hole 50 is closed by the first screw 55. In addition, the exhaust device 84 is removed from the second hole 51, and the second hole 51 is closed by the second screw 57.

According to this embodiment, the liquid-line coolant is directly injected to the pump chamber 31, whereby the pump chamber 31 may be filled with the liquid coolant within a short period of time. Thus, the pump 15 may be quickly transferred in a state in which the pump is functioned efficiently.

Moreover, since the air contained in the pump chamber 31, the reserve tank 32, the circulation passage 17, and the coolant passage 75 of the heat radiator 16 is forcibly exhausted by using the exhaust device 84, the resistance is suppressed to be low when the liquid coolant flows into the pump chamber 31, the circulation passage 17, the cooling passage 75, and the reserve tank 32.

As a result, the liquid coolant may be filled in the cooling device 14 within a short period of time, and a time required for injection of the liquid coolant may be reduced.

Further, with the above construction, the first hole 50 and the second hole 51 are provided in line with each other on the outside surface of the third side wall 22c of the casing body 19. Accordingly, the injection device 83 and the exhaust device 84 may be connected to the pump casing 18 in the same direction, and workability is improved.

In addition, the air which becomes an obstacle for injection of the liquid coolant may be exhausted merely by connecting the exhaust device 84 to the second hole 51, thus making it unnecessary to house the entire cooling device 14 in a vacuum furnace at the time of injection of the liquid coolant. Therefore, a large scale of facilities is unnecessary, so that it is possible to simplify facilities required for an injection work of the liquid coolant. In this manner, the manufacture cost of the cooling device 14 may be reduced.

The present invention is not limited to the above-described embodiment, and can be implemented by variously changing it within departing from the sprit of the invention.

For example, the first hole and the second hole each are not limited to one, and, for example, a plurality of holes may be provided.

Further, closing members which closes the first and second holes are not limited to a screw, and, for example, rubber based plugs may be pressed into the first and second holes.

In addition, a heat radiation function may be eliminated from the pump, and the heat radiation portion thermally connected to the CPU may be provided independently of the pump.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A cooling device, comprising:
    a circulation passage through which a liquid coolant flows; and
    a pump provided in the circulation passage to circulate the liquid coolant along the circulation passage, the pump including,
        (1) a pump casing including a pump chamber into which the liquid coolant flows,
        (2) an impeller mounted in the pump chamber to output the liquid coolant from the pump chamber to the circulation passage, and
        (3) an injection portion provided in the pump casing to inject the liquid coolant into the pump chamber.

2. A cooling device according to claim 1, wherein the circulation passage includes a coolant passage being a pipe substantially formed in a ring shape coaxially surrounding an impeller of a heat radiator.

3. A cooling device according to claim 1, wherein the injection portion includes an injection hole and a closing member configured to close the injection hole.

4. A cooling device according to claim 3, wherein the injection hole includes a first aperture having a first diameter and operating as an opening into the pump chamber and a second aperture having a second diameter greater than the first diameter and operating as an opening in an outside surface of a side wall of the pump casing with the closing member of the injection portion, the closing member including a screw inserted into the first and second apertures and an O-ring inserted into the second aperture and surrounding the first aperture.

5. A cooling device according to claim 3, wherein the pump casing includes a reserve tank to store the liquid coolant, an exhaust hole formed in the reserve tank, and a second closing member configured to close the exhaust hole.

6. A cooling device according to claim 5, wherein the circulation passage includes a first connection passage positioned within the reserve tank and formed with an air-liquid separation hole to allow the liquid coolant to move between the reserve tank and the pump chamber.

7. A cooling device according to claim 3, wherein the pump casing further includes: (i) a suction port configured to guide the liquid coolant to the pump chamber via the circulation passage, and (ii) an ejection port configured to eject the liquid coolant to the circulation passage from the pump chamber, the suction port and the ejection port are positioned at an opposite side of the pump casing as the injection hole while the impeller is positioned between the injection hole and the both of the suction port and the ejection port.

8. A cooling device according to claim 1, wherein the pump casing further includes a heat reception surface thermally coupled to a heat generating element, the circulation passage further includes a heat radiation portion configured to radiate heat that is absorbed by the liquid coolant through the heat reception surface and transferred to the heat radiation portion by the liquid coolant.

9. A cooling device, comprising:
a circulation passage through which a liquid coolant absorbing a heat of a heat generating element flows;
a heat radiation portion arranged in the circulation passage to radiate the heat that the liquid coolant conveys; and
a pump provided in the circulation passage configured to circulate the liquid coolant along the circulation passage, the pump including,
(1) a pump casing including a reserve tank to reserve the liquid coolant and a pump chamber which communicates with the reserve tank,
(2) an impeller mounted in the pump chamber to output the liquid coolant from the pump chamber to the circulation passage,
(3) a first opening portion provided in the pump casing, and
(4) a second opening portion provided in the pump casing.

10. A cooling device according to claim 9, wherein the first opening portion includes a first hole formed in the pump casing and a first closing member configured to close the first hole, and the second opening portion includes a second hole formed in the pump casing and a second closing member configured to close the second hole.

11. A cooling device according to claim 10, wherein the reserve tank is positioned around the pump chamber.

12. A cooling device according to claim 10, wherein the first hole is an injection hole for use in injecting the liquid coolant into the pump chamber, and the second hole is an exhaust hole for use in exhausting air inside the reserve tank.

13. A cooling device according to claim 10, wherein the pump casing further includes: (i) a suction port to guide the liquid coolant to the pump chamber, and (ii) an ejection port to eject the liquid coolant output from the pump chamber, and the first hole and the second hole are positioned at an opposite side with respect to the suction port and the ejection port while the impeller is sandwiched between the first and second holes and the suction and ejection ports.

14. A cooling device according to claim 13, wherein the pump casing further includes: a first connection passage for coupling the suction port to the pump chamber, and a second connection passage for coupling the ejection port to the pump chamber, the first connection passage and the second connection passage are positioned in the reserve tank and a through hole opening is formed in the first connection passage.

15. A cooling device according to claim 10, wherein the pump casing further includes a heat reception surface thermally coupled to the heat generating element, and the liquid coolant absorbs the heat of the heat generating element through the heat reception surface and transfers the heat that the liquid coolant conveys to the heat radiation portion.

16. A cooling device according to claim 10, wherein the first hole and the second hole are arranged in line with each other on a same surface of the pump casing.

17. An electronic apparatus, comprising:
a housing in which a heat generating element is arranged; and
a cooling device housed in the housing to radiate heat generated by the heat generating element by using a liquid coolant, the cooling device including:
a circulation passage through which the liquid coolant flows, and
a pump provided in the circulation passage configured to circulate the liquid coolant along the circulation passage, the pump including,
(1) a pump casing including a pump chamber into which the liquid coolant flows;
(2) an impeller mounted in the pump chamber to output the liquid coolant from the pump chamber to the circulation passage, and
(3) an injection portion provided in the pump casing configured to inject the liquid coolant to the pump chamber.

18. An electronic apparatus according to claim 17, wherein the injection portion includes an injection hole adapted to be closed by a closing member.

19. An electronic apparatus according to claim 18, wherein the pump casing includes a heat reception surface thermally coupled to the heat generating element, the cooling device includes a heat radiation portion to radiate a heat of the heat generating element, and the liquid coolant absorbs the heat of the heating element via the heat reception surface and transfers the heat to the heat radiation portion.

20. An electronic apparatus according to claim 19, wherein the heat radiation portion includes a coolant passage through which the liquid coolant conveying the heat flows, a plurality of heat radiation fins thermally coupled to the coolant passage, and a fan which supplies air toward the heat radiation fins.

\* \* \* \* \*